United States Patent [19]
George et al.

[11] 3,991,288
[45] Nov. 9, 1976

[54] REPEATER HOUSING ASSEMBLY

[75] Inventors: E. Paul George, Saratoga; Robert Nelson Lincoln, Cupertino, both of Calif.

[73] Assignee: Vidar Corporation, Mountain View, Calif.

[22] Filed: Dec. 12, 1974

[21] Appl. No.: 532,023

[52] U.S. Cl. ............................. 179/179; 174/38; 179/170 R
[51] Int. Cl.² ..................... H04B 3/02; H04B 3/22
[58] Field of Search ............... 179/170 R, 179, 178, 179/98; 174/38 R, 70 S, 50; 220/319; 240/151, 152

[56] References Cited
UNITED STATES PATENTS

| | | | |
|---|---|---|---|
| 1,678,946 | 7/1928 | Joyce | 220/319 |
| 2,560,099 | 7/1951 | Frank | 240/151 |
| 2,849,597 | 8/1958 | Petree | 240/151 |
| 2,895,637 | 7/1959 | Bakke et al. | 317/104 |
| 2,914,599 | 11/1959 | Clarke et al. | 174/70 S |
| 3,259,935 | 7/1966 | Miller | 220/319 |
| 3,435,124 | 3/1969 | Channell | 174/38 |
| 3,450,298 | 6/1969 | Strohmeier et al. | 220/319 |
| 3,728,467 | 4/1973 | Klayum | 174/38 |
| 3,846,677 | 11/1974 | Keever et al. | 317/107 |

Primary Examiner—Kathleen H. Claffy
Assistant Examiner—Randall P. Myers
Attorney, Agent, or Firm—Flehr, Hohbach, Test, Albritton & Herbert

[57] ABSTRACT

Housing assembly fabricated of a lightweight non-metallic material for housing a plurality of telephone line repeaters. The housing assembly includes a circular base with a perpherial thread, a generally bell-shaped cover, and a threaded retaining ring for securing the cover to the base. The repeaters are mounted in modular chassis in the housing, and the chassis can be stacked to accommodate a desired number of repeaters. Cable assemblies to be connected to the repeaters are removably secured to the base outside the housing, and the cables pass into the housing through sealed openings in the base. Valve means is provided for pressurizing and depressurizing the housing if desired.

15 Claims, 8 Drawing Figures

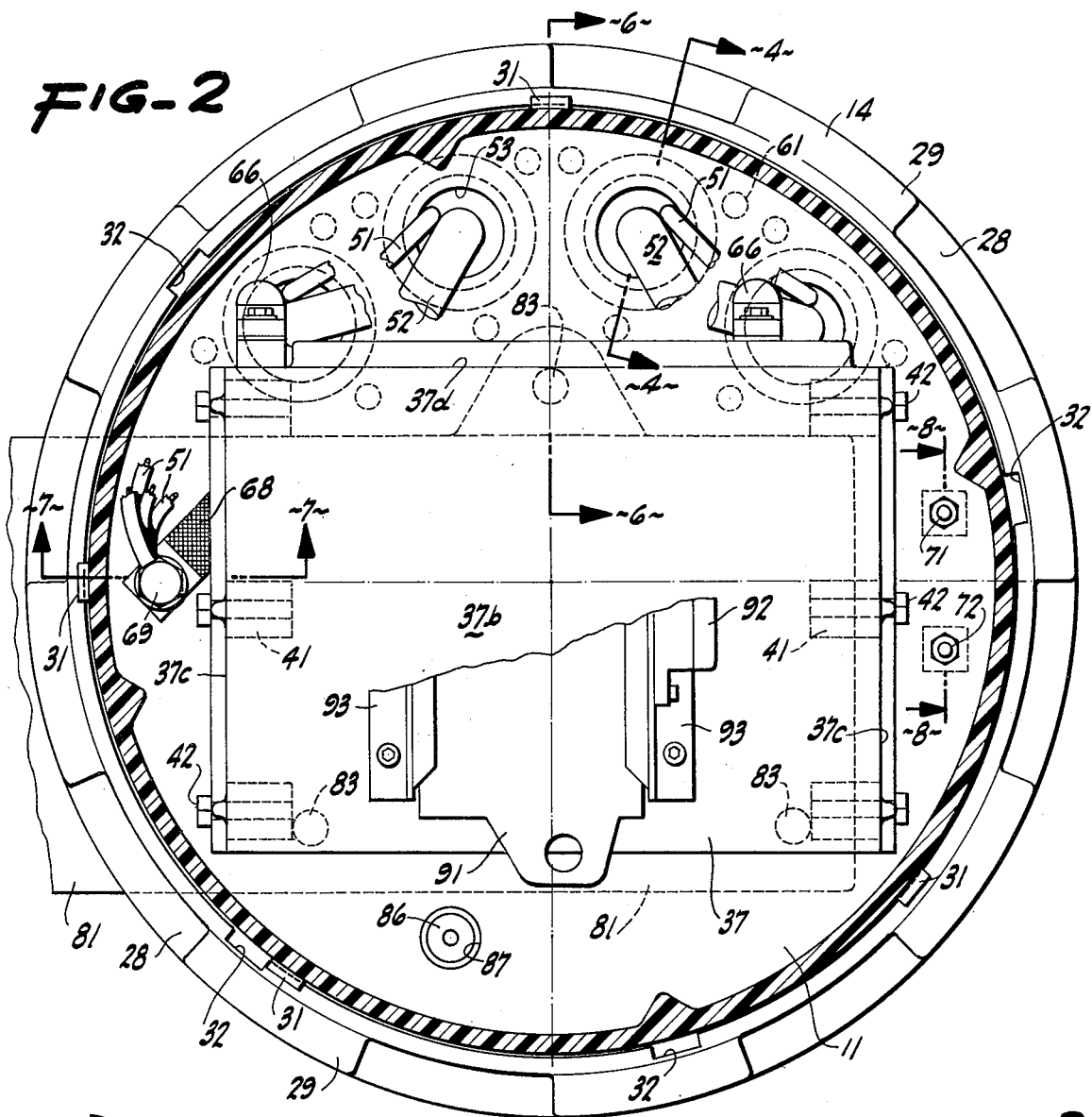
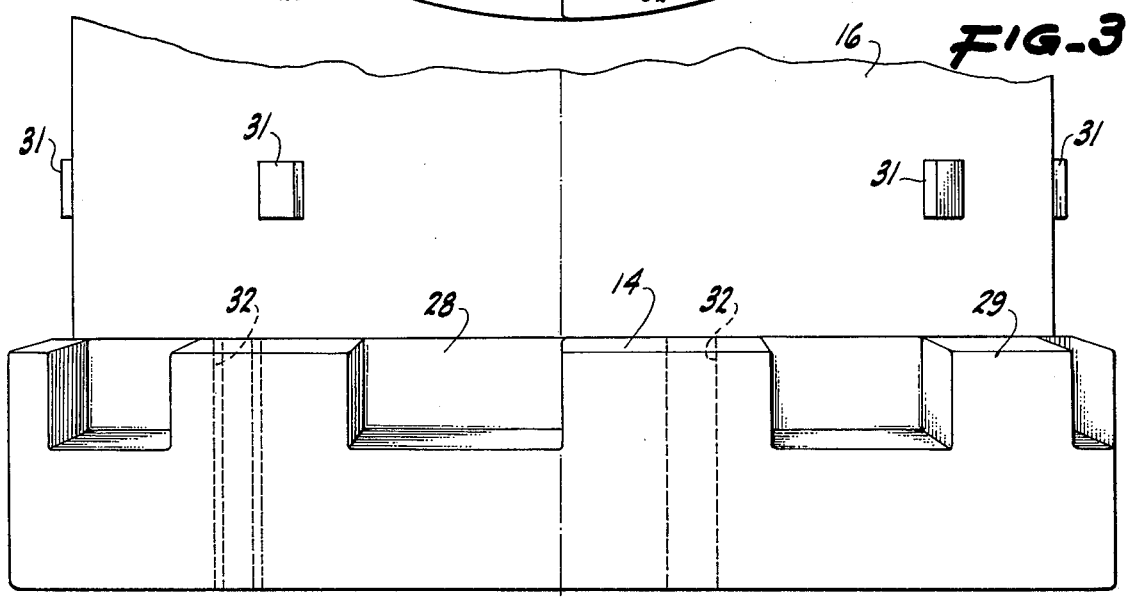

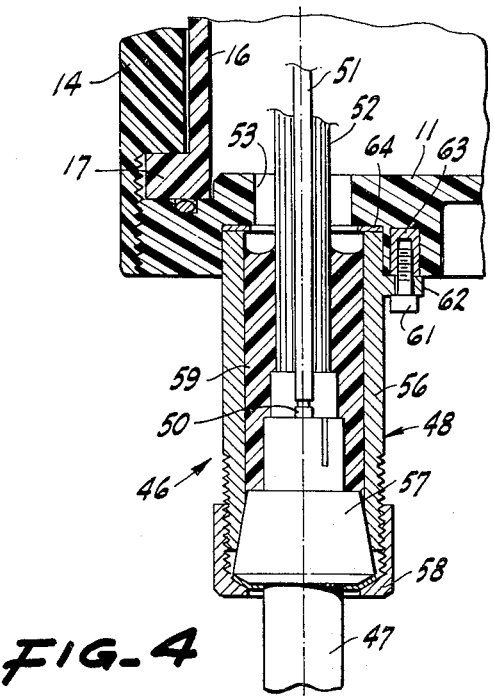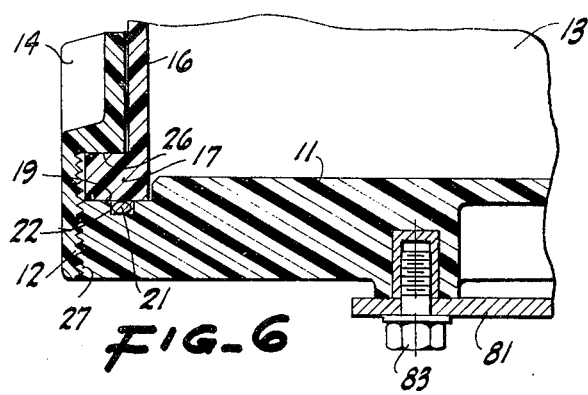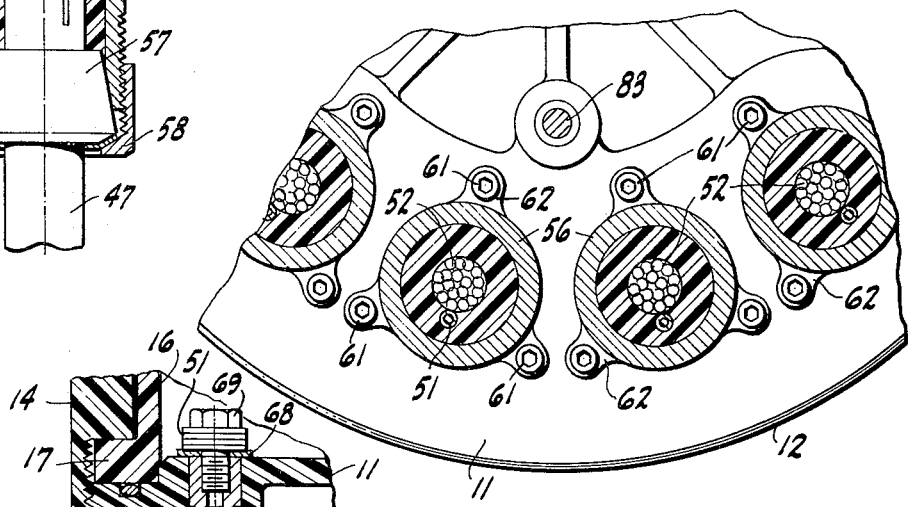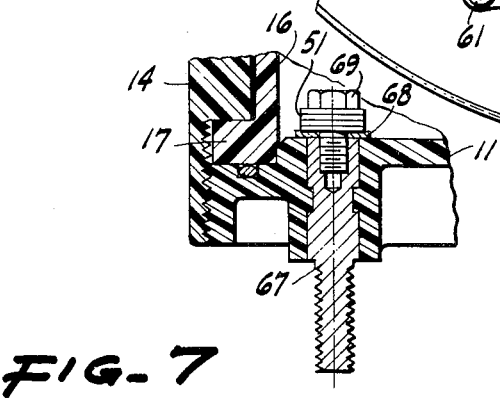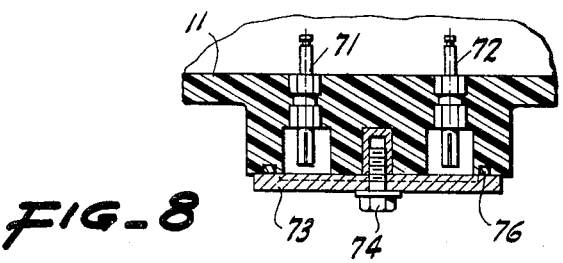

REPEATER HOUSING ASSEMBLY

BACKGROUND OF THE INVENTION

This invention pertains generally to telephone equipment and more particularily to housings for line repeaters.

Heretofore, line repeaters utilized for increasing the level of signals in telephone lines have been enclosed in metal cases which are generally mounted near the lines, for example, on poles and pedestals and in manholes. Cases fabricated of materials such as steel are heavy and subject to corrosion and rust, and they generally must be pressurized to protect the repeaters from moisture.

SUMMARY AND OBJECTS OF THE INVENTION

The invention provides a repeater housing assembly which is fabricated of a lightweight material such as a molded polycarbonate foam. The housing assembly includes a circular base with a peripheral thread, a generally bell-shaped cover, and a threaded retaining ring for securing the base to the cover. The repeaters are in modular chassis in the housing, and the chassis can be stacked to accommodate a desired number of repeaters. Cable assemblies to be connected to the repeaters are removably secured to the base outside the housing, and the cables pass into the housing through sealed openings in the base. Valve means is provided for pressurizing and depressurizing the housing if desired.

It is in general an object of the invention to provide a new and improved repeater housing assembly.

Another object is to provide a housing assembly of the above character which is fabricated of a lightweight non-metallic material such as molded polycarbonate foam.

Another object is to provide a housing assembly of the above character which includes a threaded retaining ring for drawing the cover and base together to form a water-tight seal.

Another object is to provide a housing assembly of the above character which includes stackable modular chassis for holding the repeaters.

Another object is to provide a housing assembly of the above character in which cable assemblies are removably mounted on the base of the assembly.

Additional objects and features of the invention will be apparent from the following description in which the preferred embodiment is set forth in detail in conjunction with the accompanying drawings.

BRIEF DESCRIPTION OF THE DRAWINGS

FIG. 2 is a cross-sectional view taken along line 2—2 in FIG. 1.

FIG. 3 is a fragmentary side elevational view of the housing assembly of FIG. 1.

FIG. 4 is a cross-sectional view taken along line 4—4 in FIG. 2.

FIG. 5 is a cross-sectional view taken along 5—5 in FIG. 1.

FIG. 6 is a cross-sectional view taken along line 6—6 in FIG. 2.

FIG. 7 is a cross-sectional view taken along line 7—7 in FIG. 2.

FIG. 8 is a cross-sectional view taken along line 8—8 in FIG. 2.

DESCRIPTION OF THE PREFERRED EMBODIMENT

Figure 1:
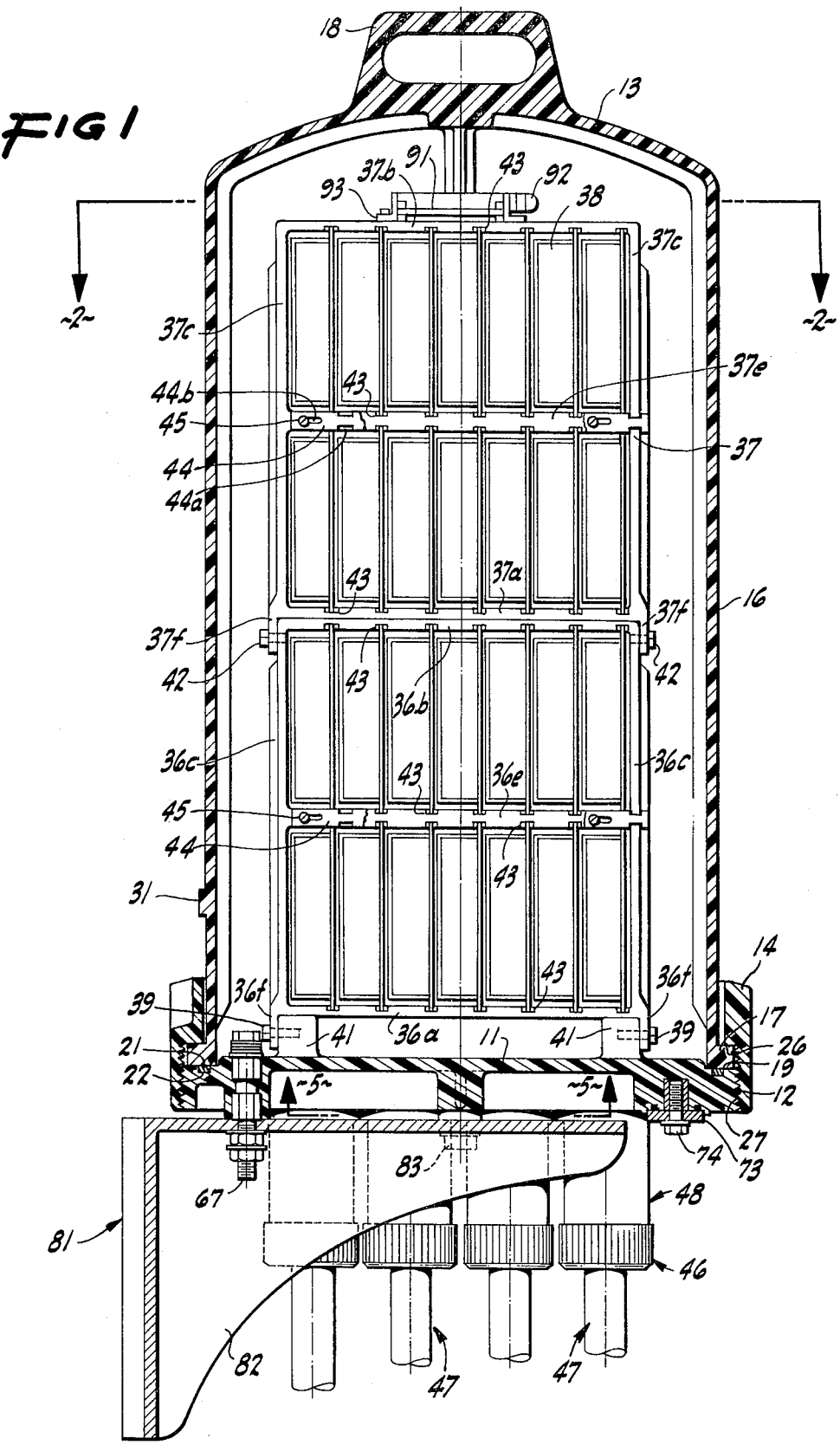
FIG. 1 is a centerline sectional view of one embodiment of a repeater housing assembly according to the invention.

The housing assembly includes a generally circular base 11 having a perpherial thread 12, a cover removably mounted on the base, and a retainer ring 14 for securing the base and cover together.

Cover 13 is generally bell-shaped, and it includes a cylindrical side wall 16 which terminates at its lower end in an annular flange 17. A handle 18 is provided at the top of the cover. The base is formed with an annular upper surface 19 adjacent to flange 17, and an O-ring 21 is disposed in an angular grove 22 which opens through surface 19.

Retainer ring 14 is rotatively mounted on the cylindrical wall of cover 13, and it includes a radial shoulder 26 which abuts against the upper surface of flange 17 and a thread 27 which engages thread 12. The retaining ring is formed with a plurality of circumferentially spaced notches 28 and lands 29 which facilitate gripping the ring to rotate the same.

Means is provided for preventing the removal of the retaining ring from the cover except when the ring is in a predetermined rotative position. This means include a plurality of lugs 31 which extend radially from the side wall of cover 13 a predetermined distance above flange 17. In the preferred embodiment, the lugs are formed as an integral part of the cover. The retainer ring is formed with a plurality of axially extending slots 32 which can be aligned with lugs 31 to permit axially movement of the ring past the lugs. The lugs and slots are asymetrically spaced so that they are aligned only when the ring is in the predetermined rotative position.

In the preferred embodiment, the base, cover and retainer ring are all molded of a lightweight non-metallic material such as Lexan or another suitable polycarbonate foam. The molded components are manufactured by a suitable process such as injection molding.

Generally rectangular modular chassis 36, 37 are mounted within the housing for holding a plurality of repeaters 38. These two chassis are identical in structure, and each includes a bottom wall *a*, a top wall *b*, side walls *c*, a back wall *d* and a horizontal divider *e*. Each of the chassis also includes a pair of mounting flanges *f* which depend from the lower portions of the side walls and are offset therefrom to permit stacking of the chassis. In the embodiment illustrated, chassis 38 is mounted on base 11 by means of screws 39 which pass through openings in flanges 36*f* into raised bosses 41 on the base. C Chassis 37 is mounted on top of chassis 36 and secured thereto by screws 42. In the embodiment illustrated, each of the chassis holds up to 14 repeaters, and a greater or lesser number of chassis can be utilized, depending upon the number of repeaters to be housed. The height of the cover can be varied in accordance with the number of chassis.

Sockets (not shown) are mounted on the rear walls of the chassis for receiving the connector pins of the repeaters in a plug-in fashion. Vertically aligned slots 43 are formed in the top walls, bottom walls and dividers of the chassis for receiving flanges on the repeaters to assure proper alignment of the repeaters and facilitate their installation. Retainer bars 44 provided with notches 44*a* corresponding in spacing to slots 43 are mounted on the fronts of the chassis dividers to prevent the repeaters from coming out of their sockets due to vibration or other disturbances. These bars are mounted by screws 45 which pass through slotted openings 44b in the bars to permit notches 44a to be moved into and out of alignment with slots 43, depending upon whether the repeaters are to be removed, installed or retained.

In the preferred embodiment, each of the modular chassis is fabricated as a unitary structure which is molded of a suitable insulative material such as Lexan or another polycarbonate foam.

Cable assemblies 46 are removably mounted on the lower side of base 11 outside the housing. Each cable assembly includes a cable 47 and a terminator 48. The cable includes a ground shield 50 which is connected to a ground conductor 51 in the terminator and a plurality of line conductors 52 which pass through a counterbored opening 53 into the housing for connection to the repeaters. The terminator includes a sleeve 56 which is disposed coaxially of the cable and sealed at its lower end by a gland 57 which is retained on the sleeve by a gland nut 58. A damming compound 59 such as epoxy resin is poured into the region between cable 47 and sleeve 56 to assure a rigid, moisture-proof structure. The upper portion of sleeve 56 extends into the counterbore of opening 53, and the cable assembly is secured to the base by means of screws 61 which extend through radial flanges 62 on the terminator sleeve into threaded inserts 63 mounted in the base. An annular seal member 64 is disposed between the upper end of sleeve 56 and the shoulder of the counterbored opening to form a moisture tight seal about the opening.

Lightning and high voltage protection for the repeaters is provided by a plurality of three-terminal gas-discharge devices in a protective assembly 66 mounted on the rear walls of chassis 36 and 37. Assemblies 66 are preferably of a type disclosed in co-pending application Serial No. 532,024, now U.S. Pat. No. 3,917,982, and connections between the repeaters and the conductors 52 in cable 47 are made through the protective devices. These devices shunt high voltages on the lines to ground and prevent them from reaching the repeaters.

A ground terminal 67 is molded into base 11 during manufacture and extends through the base. The lower portion of this terminal is threaded for connection to a suitable external ground, and a ground strap 68 is connected to the upper portion of the terminal by a screw 69. The strap is connected to the ground busses of protective assemblies 66, and the ground terminals of the repeaters. Ground connectors 51, which are connected to cable ground shields 50, are also connected to terminal 67.

Order wire terminals 71 and 72 are also molded into the base during manufacture. These terminals extend through the base and are accessible to the serviceman or installer externally of the housing. The inner ends of the terminals are connected to suitable lines from the cables, and the outer ends are protected by a removable cover 73 which is secured in place by a screw 74 and sealed by a rectangular sealing gasket 76.

A generally L-shaped mounting bracket 81 is provided for mounting the housing assembly on a desired surface such as a pole or pedestal. This bracket includes reinforcing gussets 82, and the housing assembly is secured to the bracket by mounting screws 83.

Means have been provided for pressurizing and depressurizing the interior of the housing if desired. This means includes an air valve 86 mounted in a counterbored opening 87 in base 11. In the preferred embodiment, valve 86 is of a type commonly used for pneumatic tires, and the stem of the valve extends below the base.

An interrogation filter 91 and a protective assembly 92 are mounted on top of chassis module 37. This protective assembly is similar to assemblies 66, and it provides lightning and high voltage protection for the filter. The filter constructed on a printed circuit board which is slidably received on a generally U-shaped mounting bracket 93. Connections to the filter are made through connector pins and a socket (not shown) at the closed end of the mounting bracket, and the protective assembly is mounted on one side of the bracket.

Operation and use of the repeater housing assembly can be described briefly. It is assumed that chassis 36 and 37, cable 46, and protective assemblies 66 have been installed and interconnected in the manner described above. It is further assumed that the assembly has been mounted in a suitable location such as a pole or pedestal and that an external ground connection has been made to terminal 67. Retaining ring 14 is mounted on cover 13 by aligning slots 32 with lugs 31 and passing the ring over the cylindrical wall of the cover in an axial direction toward flange 17. With the cover resting on the base, the ring is rotated to draw the cover and the base together and compress O-ring 21. With the retaining ring tightened, the housing is hermetically sealed. Thereafter, if desired, the interior of the housing can be pressurized by introducing air or another suitable gas under pressure through valve 86.

The housing assembly is easily opened by unscrewing ring 14 from base 11. If the housing has been pressurized, the pressure should be released through valve 86 before the ring is removed. With the assembly closed, a lineman or serviceman can have ready access to order wire terminals 71 and 72 simply by partially loosening screw 74 and rotating cover plate 73 by 90°.

The invention has a number of important features and advantages. It is fabricated of a lightweight nonmetallic material which has a strength-to-weight ratio substantially higher than steel and which also provides superior environmental protection. The threaded retainer ring assures a moisture tight seal between the cover and base and eliminates the need for pressurization of the housing in most applications. The stackable modular chassis permits easy expansion to accommodate more repeaters. External access to order wire terminals precludes unneccessary opening of the case by serviceman.

It is apparent from the foregoing that a new and improved repeater housing assembly has been provided. While only the preferred embodiment has been described, as will be apparent to those familiar with the art, certain changes and modifications can be made without departing from the scope of the invention as defined by the following claims.

We claim:

1. In a repeater housing assembly: a generally circular base having a peripheral thread, a generally bell shaped cover removably mounted on the base and cooperating therewith to form a housing, said cover having an annular flange toward its lower end adjacent to the base, a retainer ring rotatively mounted on the cover and having a radial shoulder engaging the upper surface of the cover flange and a thread engaging the thread on the base whereby the base and cover can be drawn together by rotating the ring relative to the base, a modular chassis mounted on the base, a plurality of repeaters removably mounted on the modular chassis for repeating signals on telephone wires, and a cable assembly comprising a plurality of wires extending through an opening in the base for connection to the repeaters and a terminator affixed to the wires and removably mounted on the base outside the housing.

2. The assembly of claim 1 wherein the cover is formed to include at leaast one radially extending lug spaced from the annular flange and the retaining ring is formed to include an axially extending slot through which the lug can pass to permit removal of the ring from the cover when the ring is in a predetermined rotative position.

3. The assembly of claim 1 wherein the terminator comprises a sleeve disposed generally coaxially of the wires, means forming a hermetic seal between the sleeve and wires, a seal member disposed between the sleeve and base, and threaded means for drawing the sleeve and base together.

4. The assembly of claim 1 further including valve means mounted on the base for pressurizing the interior of the housing.

5. The assembly of claim 1 further including a second modular chassis mounted on the first named chassis, the two chassis being of similar construction and having mounting flanges adapted to engage either the base or another chassis whereby the chassis can be stacked.

6. The assembly of claim 1 wherein the base, cover, retainer ring and chassis module are fabricated of a lightweight non-metallic material.

7. The assembly of claim 6 wherein the non-metallic material is a molded polycarbonate foam.

8. In an assembly for housing telephone equipment: a generally circular base having a peripheral thread, a cover removably mounted on the base and cooperating therewith to form a housing, said cover including a generally cylindrical wall with a flange extending radially therefrom, a retainer ring rotatively mounted on the cover, said ring having a radial shoulder for engaging the flange on the cover and a thread for engaging the thread on the base whereby the base and cover can be drawn together by rotating the ring relative to the base, and at least one lug extending radially from the cover and spaced axially from the flange, the shoulder of the retaining ring being formed to include an axially extending slot through which the lug can pass to permit removal of the ring from the cover only when the lug is aligned with the slot.

9. The assembly of claim 8 wherein the base, cover and retainer ring are molded of a polycarbonate material.

10. The assembly of claim 8 wherein the cover flange is located at the end of the cylindrical wall and adjacent to the base, together with a seal member disposed between the flange and the base.

11. The assembly of claim 8 further including valve means mounted on the base for pressurizing the interior of the housing.

12. In an assembly for housing telephone equipment: a generally circular base having a peripheral thread, a cover removably mounted on the base and cooperating therewith to form a housing, said cover including a generally cylindrical wall with a flange extending radially therefrom, a retainer ring rotatively mounted on the cover, said ring having a radial shoulder for engaging the flange on the cover and a thread for engaging the thread on the base whereby the base and cover can be drawn together by rotating the ring relative to the base, a modular chassis mounted on the base for receiving telephone equipment, said chassis having depending mounting flanges engaging the base, the upper portion of the chassis being adapted for receiving the mounting flanges of a similar chassis, and at least one cable extending from the base for interconnecting the equipment within the housing with telephone lines located externally of the housing.

13. The assembly of claim 12 wherein the mounting flanges are offset from the sides of the chassis in such manner that the flanges of a chassis stacked on the first named chassis embrace the sides of the first named chassis.

14. The assembly of claim 12 wherein the chassis has spaced apart walls having aligned slots formed therein for receiving the telephone equipment and means for blocking the ends of the slots in one wall for retaining the equipment in the slots.

15. In an assembly for housing telephone equipment: a generally circular base having a peripheral thread, a cover removably mounted on the base and cooperating therewith to form a housing, said cover including a generally cylindrical wall with a flange extending radially therefrom, a retainer ring rotatively mounted on the cover, said ring having a radial shoulder for engaging the flange on the cover and a thread for engaging the thread on the base whereby the base and cover can be drawn together by rotating the ring relative to the base, means mounted on the base for receiving telephone equipment, and a cable assembly comprising a cable passing through an opening in the base for connecting the telephone equipment with telephone lines located externally of the housing and a terminator mounted on the base externally of the housing, said terminator comprising a housing surrounding the cable, means forming a hermatic seal between the cable and the terminator housing, a seal member disposed between the terminator housing and the base, and means for drawing the terminator housing and the base together.

* * * * *